United States Patent
Xu

(10) Patent No.: US 8,253,841 B2
(45) Date of Patent: Aug. 28, 2012

(54) PORTABLE ELECTRONIC DEVICE

(75) Inventor: Bang-Xi Xu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 622 days.

(21) Appl. No.: 12/485,125

(22) Filed: Jun. 16, 2009

(65) Prior Publication Data

US 2010/0134678 A1    Jun. 3, 2010

(30) Foreign Application Priority Data

Dec. 1, 2008 (CN) .......................... 2008 1 0305880

(51) Int. Cl.
    *H04N 5/225* (2006.01)
(52) U.S. Cl. ........................ 348/340; 348/373
(58) Field of Classification Search .................. 348/335, 348/340, 373
    See application file for complete search history.

(56) References Cited

U.S. PATENT DOCUMENTS

| | | | |
|---|---|---|---|
| 4,605,286 A * | 8/1986 | Sumi | 359/696 |
| 6,268,882 B1 * | 7/2001 | Elberbaum | 348/151 |
| 6,715,939 B2 * | 4/2004 | Ford | 396/427 |
| 6,800,970 B2 * | 10/2004 | Aoshima | 310/49.32 |
| 7,161,630 B2 * | 1/2007 | Akimoto et al. | 348/394.1 |
| 7,221,526 B2 * | 5/2007 | Manabe | 359/824 |
| 7,652,836 B2 * | 1/2010 | Aoki et al. | 359/824 |
| 7,656,452 B2 * | 2/2010 | Saito et al. | 348/340 |
| 2006/0061891 A1 * | 3/2006 | Ito et al. | 359/824 |
| 2008/0112066 A1 * | 5/2008 | Harada et al. | 359/819 |
| 2008/0170849 A1 * | 7/2008 | Kaneko et al. | 396/384 |
| 2008/0174690 A1 * | 7/2008 | Chang | 348/345 |
| 2009/0103914 A1 * | 4/2009 | Kitagawa et al. | 396/448 |
| 2009/0316040 A1 * | 12/2009 | Takatsuka et al. | 348/376 |
| 2010/0110274 A1 * | 5/2010 | Reynolds et al. | 348/360 |

* cited by examiner

*Primary Examiner* — Lin Ye
*Assistant Examiner* — Amy Hsu
(74) *Attorney, Agent, or Firm* — Altis Law Group, Inc.

(57) ABSTRACT

A portable electronic device includes a cover, a printed circuit board, and a lens module mounted on the printed circuit board and covered by the cover. The cover and the lens module both define a light transmitting hole. The cover includes a retaining portion, the lens module includes a latching portion engaged with the retaining portion of the cover, thus ensuring the coaxiality of the light transmitting holes of the cover and the lens module.

15 Claims, 4 Drawing Sheets

PORTABLE ELECTRONIC DEVICE

BACKGROUND

1. Technical Field

The present disclosure generally relates to portable electronic devices and, particularly, to a portable electronic device having a lens module.

2. Description of Related Art

Portable electronic devices having a lens module used to take photographs are now in widespread use. Generally, the lens module is mounted in the portable electronic device by engaging with other components of the portable electronic device.

A typical portable electronic device includes a cover, a lens module, and a printed circuit board (PCB). The cover defines a light transmitting hole. The lens module includes a fixed seat mounted on the PCB, and a lens barrel received in the fixed seat. The lens barrel defines a light transmitting hole, and includes a plurality of optical lenses fixed in the lens barrel. The lens module is covered by the cover. The light transmitting hole of the lens barrel and the light transmitting hole of the cover must have a common axis. However, it is difficult to precisely align the light transmitting holes of the lens barrel and the cover along the common axis, thus making it inconvenient to assemble the portable electronic device.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

The portable electronic device may be a mobile phone, or a personal digital assistant. Hereinafter, for the purposes of concisely describing the portable electronic device, just partial components of the portable electronic device is described and illustrated in detail.

Figure 1:
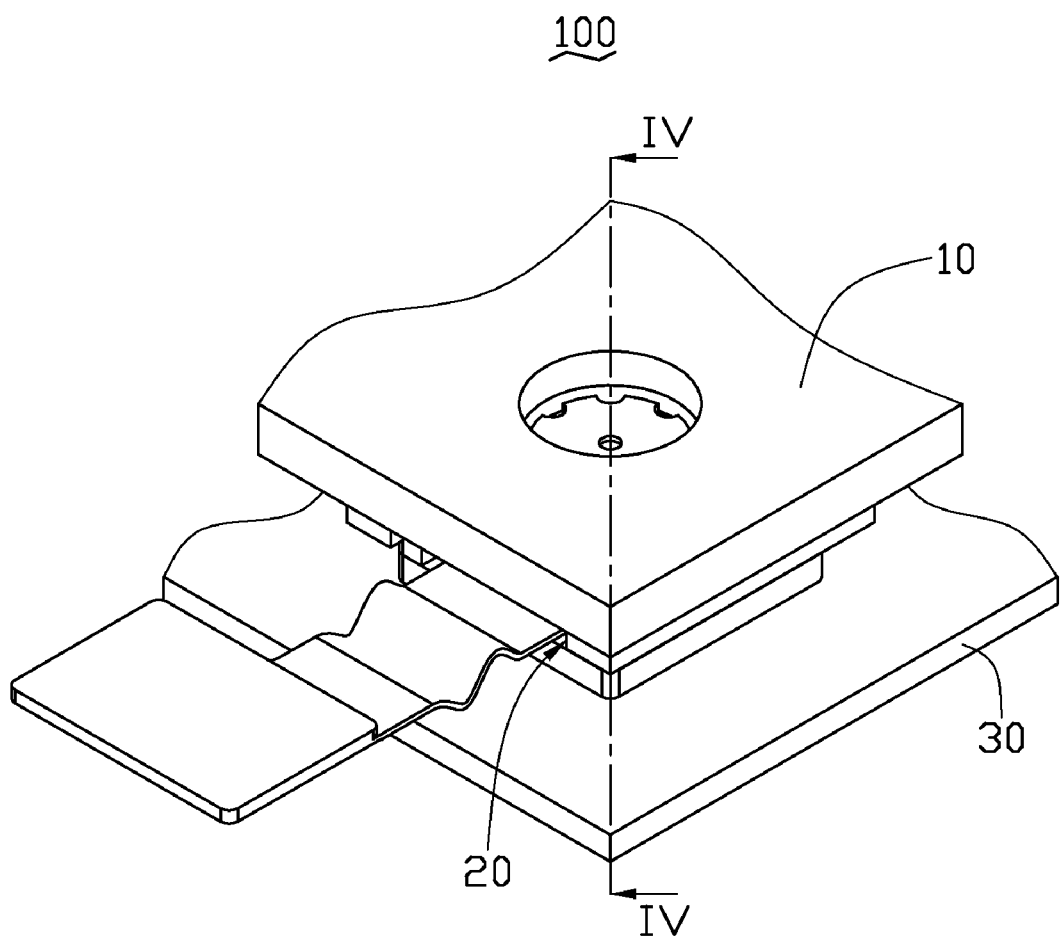
FIG. 1 is a partial, assembled, isometric view of an embodiment of a portable electronic device.

Referring to FIG. 1, one embodiment of a portable electronic device 100 includes a cover 10, a lens module 20, and a PCB 30. The lens module 20 is mounted on the PCB 30, and covered by the cover 10.

Figure 2:
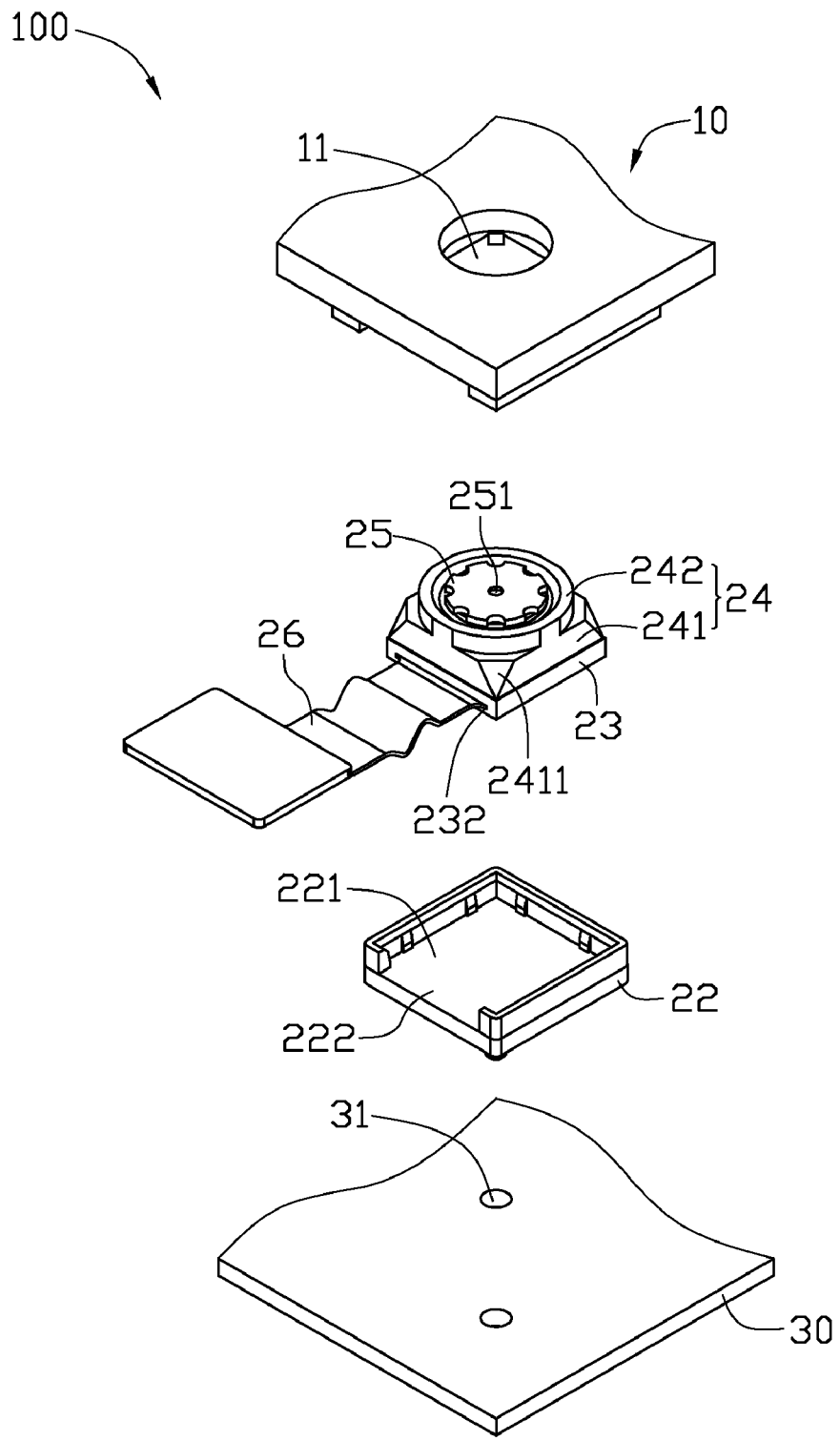
FIG. 2 is a partial, exploded, isometric view of the portable electronic device in FIG. 1.
Figure 3:
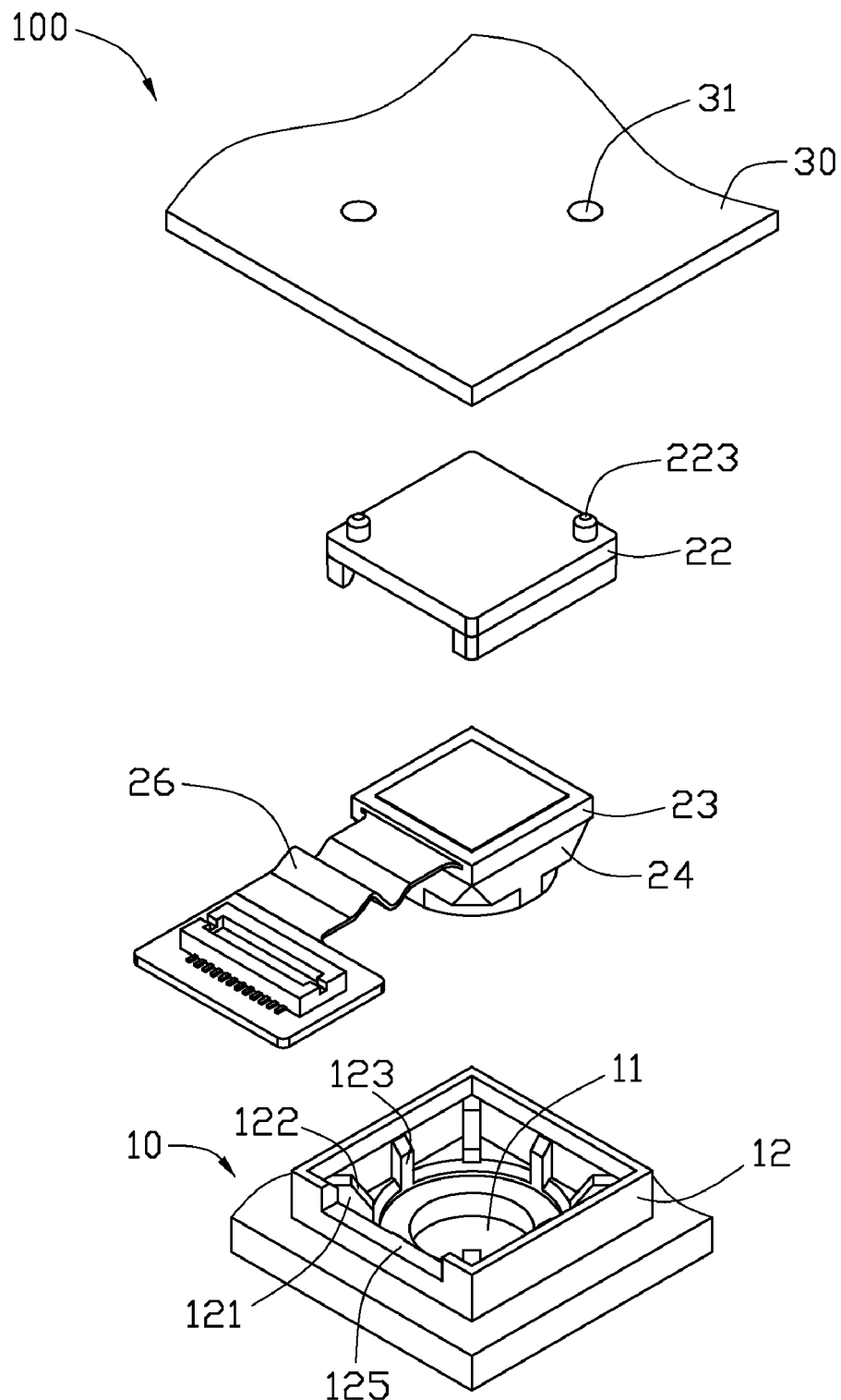
FIG. 3 is similar to FIG. 2, but viewed from another direction.

Referring to FIGS. 2 and 3, the cover 10 defines a light transmitting hole 11, and forms a retaining portion 12 on a periphery of the light transmitting hole 11. In the illustrated embodiment, the retaining portion 12 is a substantially rectangular frame. The retaining portion 12 forms four retaining protrusions 121, three guiding protrusions 123 on inner surfaces, and defines a notch 125 in a side wall. The four retaining protrusions 121 are formed on four corners of the retaining portion 12, respectively. Each guiding protrusion 123 is formed between two retaining protrusions 121. Each retaining protrusions 121 includes an abutting surface 122 inclined towards the axis of the light transmitting hole 11. In an alternative embodiment, the retaining portion 12 may have a different shape, such as a substantially circular ring. The amount of the retaining protrusions 121 and the guiding protrusions 123 may vary.

Figure 4:
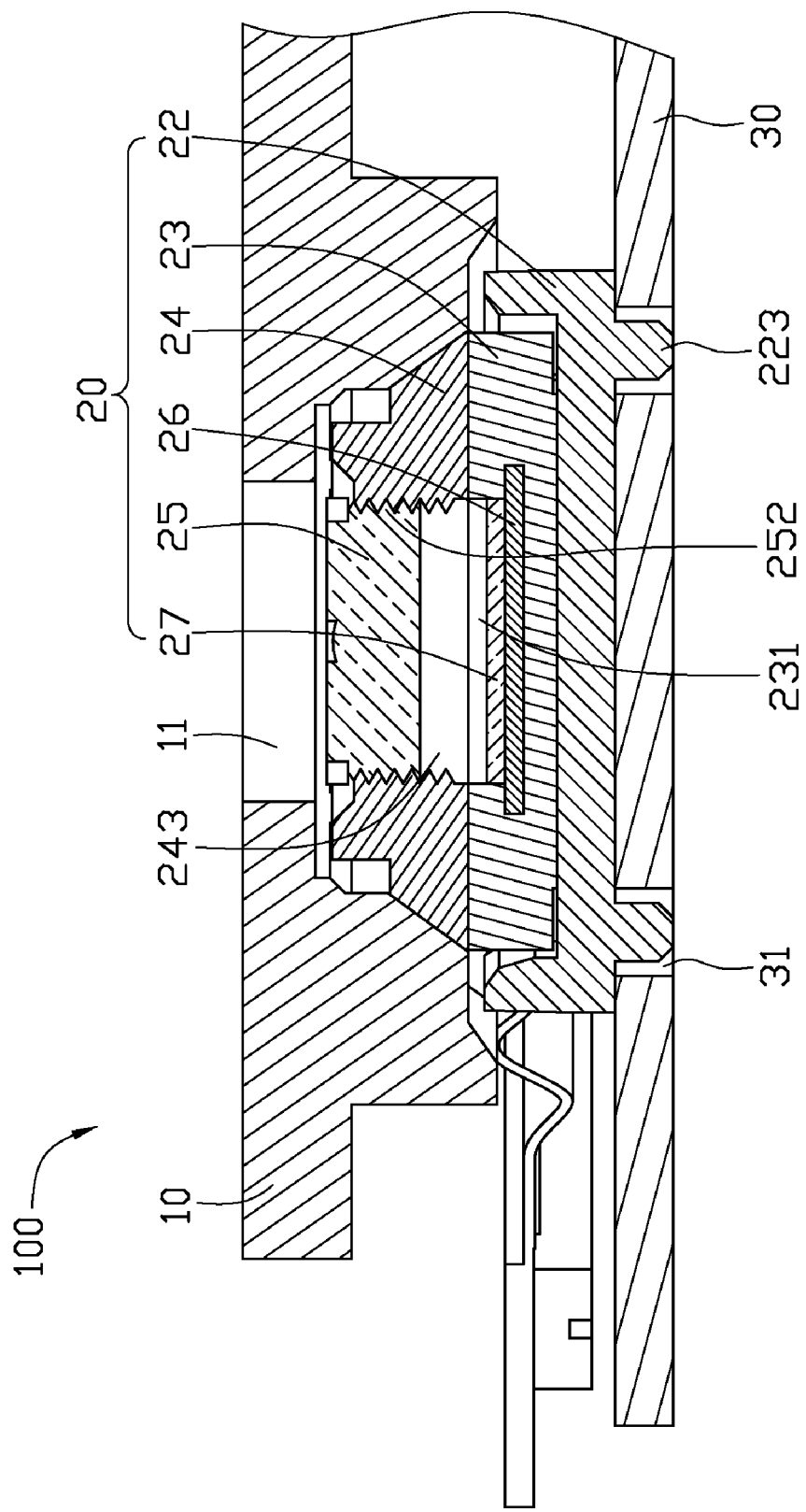
FIG. 4 is a cross-sectional view of the portable electronic device in FIG. 1, taken along line IV-IV.

Referring also to FIG. 4, the lens module 20 includes a fixed member 22, a main body 23, a base seat 24 mounted on the main body 23, a lens barrel 25 received in the base seat 24, a flexible printed circuit (FPC) 26 connected to the main body 23, and a sensor chip 27 positioned in the main body 23.

The fixed member 22 includes four side walls cooperatively define a cavity 221. The bottom surface of the cavity 221 forms an adhesive layer (not shown) to fix the main body 23 in the cavity 221. The fixed member 22 defines a notch 222 in a side wall. Two positioning poles 223 are formed on the fixed member 22 and configured to fix the fixed member 22 on the PCB 30.

The main body 23 defines a receiving groove 231 to receive the sensor chip 27. The main body 23 also defines a mounting groove 232 to allow the FPC 26 to insert in the receiving groove 231 and contact with the sensor chip 27.

The base seat 24 includes a latching portion 241, and a mounting portion 242 formed on the latching portion 241. In the illustrated embodiment, the latching portion 241 is a substantially rectangular block, and four corners of the latching portion 241 are flattened to form four latching surfaces 2411. The mounting portion 242 is substantially cylindrical, and defines a threaded hole 243 extending through the base seat 24, and communicating with the receiving groove 231 of the main body 23. In alternative embodiments, the shapes of the latching portion 241 and the mounting portion 242 may vary. For example, the latching portion 241 and the mounting portion 242 may be both substantially rectangular blocks, or that, the latching portion 241 and the mounting portion 242 may be both substantially cylindrical.

The lens barrel 25 defines a light transmitting hole 251. The lens barrel 25 includes a plurality of optical lens (not shown) fixed in the lens barrel 25. A threaded portion 252 (shown in FIG. 4) is formed on the lens barrel 25 and configured to engage with the threaded hole 243 of the base seat 24.

The PCB 30 defines two positioning holes 31 to receive the positioning poles 222 of the fixed member 22.

When assembling the portable electronic device 100, the positioning poles 222 of the fixed member 22 are received in the positioning holes 31 of the PCB 30. The main body 23 is fixed in the cavity 221 of the fixed member 22. The cover 10 is positioned on top of the lens module 20. The notch 125 of the cover 10 and the notch 222 of the fixed member 22 cooperatively define a through hole to allow the FPC 26 to pass through.

When the cover 10 is assembled on the lens module 20, the base seat 24 of the lens module 20 easily engages in the retaining portion 12 of the cover 10 guided by the guiding protrusions 123. The latching surfaces 2411 of the base seat 24 abut against the abutting surfaces 122 of the retaining protrusions 121. Such that, the base seat 24 is stably positioned in the retaining portion 12 of the cover 10, thus ensuring the coaxiality of the light transmitting holes 11, 251 of the cover 10 and the lens barrel 25. Therefore, it is convenient to assemble the portable electronic device 100.

In alternative embodiments, the retaining portion 12 of the cover 10 may just includes a plurality of the retaining protrusions 121, the guiding protrusions 123 and the sidewalls of the latching portion 12 may all be omitted. One of the retaining portion 12 of the cover 10 and the latching portion 241 of the base seat 24 may define a plurality of engaging grooves, the other one of the retaining portion 12 and the latching portion 241 may form a plurality of engaging protrusions to engage in the engaging grooves to ensure the coaxiality of the light transmitting holes 11, 251 of the cover 10 and the lens barrel 25.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A portable electronic device comprising:
   a cover defining a light transmitting hole;
   a printed circuit board; and
   a lens module mounted on the printed circuit board and the lens module covered by the cover, the lens module defining a light transmitting hole;
   wherein the cover forms a retaining portion comprising a plurality of retaining protrusions, each retaining protrusion forms an abutting surface inclined towards the axis of the light transmitting hole of the cover; the lens module comprises a latching portion engaging the retaining portion of the cover through the abutting surfaces, thus ensuring the coaxiality of the light transmitting holes of the cover and the lens module.

2. The portable electronic device of claim 1, wherein the retaining protrusions formed on a periphery of the light transmitting hole of the cover, and the latching portion of the lens module forms a plurality of latching surfaces abutting against the abutting surfaces of the cover.

3. The portable electronic device of claim 2, wherein the retaining portion of the cover further comprises a plurality of guiding protrusions, and each guiding protrusion is formed between two retaining protrusions.

4. The portable electronic device of claim 2, wherein the retaining portion of the cover is a substantially rectangular frame, the retaining protrusions are formed on four corners of the retaining portion; the latching portion of the lens module is a substantially rectangular block, and four corners of the latching portion are flattened to form the latching surfaces.

5. The portable electronic device of claim 1, wherein one of the retaining portion and the latching portion defines an engaging groove, and the other one of the retaining portion and the latching portion forms an engaging protrusion to engage in the engaging groove.

6. The portable electronic device of claim 1, wherein the printed circuit board defines a positioning hole; and the lens module further comprises a fixed member forming a positioning pole to receive in the positioning hole of the printed circuit board.

7. The portable electronic device of claim 6, wherein the fixed member defines a cavity; the lens module further comprises a main body fixed in the cavity of the fixed member; the lens module further comprises a sensor chip and a flexible printed circuit; the main body defines a receiving groove to receive the sensor chip, and a mounting groove to allow the flexible printed circuit to insert in the receiving groove and contact with the sensor chip.

8. The portable electronic device of claim 7, wherein the lens module further comprises a base seat mounted on the main body; the base seat comprises the latching portion, and a mounting portion formed on the latching portion; the mounting portion defines a threaded hole extending through the base seat, and communicating with the receiving groove of the main body; the lens module further comprises a lens barrel received in the threaded hole of the mounting portion, the light transmitting hole of the lens module is defined in the lens barrel.

9. A portable electronic device comprising:
   a cover defining a light transmitting hole;
   a printed circuit board; and
   a lens module mounted on the printed circuit board and the lens module covered by the cover, the lens module defining a light transmitting hole;
   wherein the cover comprises a retaining portion forming a plurality of retaining protrusions, each retaining protrusion forms an abutting surface inclined towards the axis of the light transmitting hole of the cover; the lens module comprises a latching portion forming a plurality of latching surfaces abutting against the abutting surfaces of the cover, thus ensuring the coaxiality of the light transmitting holes of the cover and the lens module.

10. The portable electronic device of claim 9, wherein the retaining portion of the cover further comprises a plurality of guiding protrusions, each guiding protrusion is formed between two retaining protrusions.

11. The portable electronic device of claim 9, wherein the retaining portion of the cover is a substantially rectangular frame, the retaining protrusions are formed on four corners of the retaining portion; the latching portion of the lens module is a substantially rectangular block, and four corners of the latching portion are flattened to form the latching surfaces.

12. The portable electronic device of claim 9, wherein the printed circuit board defines a positioning hole; the lens module further comprises a fixed member forming a positioning pole to insert in the positioning hole of the printed circuit board.

13. The portable electronic device of claim 12, wherein the fixed member defines a cavity; the lens module further comprises a main body fixed in the cavity of the fixed member; the lens module further comprises a sensor chip and a flexible printed circuit; the main body defines a receiving groove to receive the sensor chip, and a mounting groove to allow the flexible printed circuit to insert in the receiving groove and contact with the sensor chip.

14. The portable electronic device of claim 13, wherein the retaining portion of the cover and the fixed member both define a notch, the notches of the retaining portion and the fixed member cooperatively define a through hole to allow the flexible printed circuit to pass through.

15. The portable electronic device of claim 13, wherein the lens module further comprises a base seat mounted on the main body; the base seat comprises the latching portion, and a mounting portion formed on the latching portion; the mounting portion defines a threaded hole extending through the base seat, and communicating with the receiving groove of the main body; the lens module further comprises a lens barrel threaded in the threaded hole of the mounting portion, the light transmitting hole of the lens module is defined in the lens barrel.

* * * * *